(12) United States Patent
Sinkov (10) Patent No.: US 9,665,205 B1
(45) Date of Patent: May 30, 2017

(54) PROGRAMMABLE TOUCH EMULATING DEVICE

(71) Applicant: Evernote Corporation, Redwood City, CA (US)

(72) Inventor: Andrew Sinkov, San Francisco, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 126 days.

(21) Appl. No.: 14/601,521

(22) Filed: Jan. 21, 2015

Related U.S. Application Data (60) Provisional application No. 61/930,156, filed on Jan. 22, 2014.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC .................. G06F 3/0416; G06F 3/044; G06F 2203/04809; G06F 3/039; G06F 3/041–3/04897; G09B 5/00
See application file for complete search history.

(56) References Cited

U.S. PATENT DOCUMENTS 5,851,119 A * 12/1998 Sharpe, III ............. G09B 11/00
                                                             434/169
9,110,543 B1 * 8/2015 Dabell .................... G06F 3/044

2002/0158849 A1* 10/2002 Severson ............. G06F 1/1626
                                                                 345/173
2011/0199325 A1* 8/2011 Payne ..................... A63F 13/02
                                                                 345/173
2012/0007822 A1* 1/2012 Luo ......................... G06F 3/041
                                                                 345/173
2013/0120258 A1* 5/2013 Maus ..................... G06F 3/044
                                                                 345/161
2014/0139455 A1* 5/2014 Argiro .................... A63F 13/02
                                                                 345/173

(Continued)

FOREIGN PATENT DOCUMENTS

WO    WO 2010070528 A1 * 6/2010 ............. G06F 3/038

*Primary Examiner* — Nalini Mummalaneni
*Assistant Examiner* — Ivelisse Martinez Quiles
(74) *Attorney, Agent, or Firm* — Morgan, Lewis & Bockius LLP (57) ABSTRACT

A touch emulator includes a transparent surface portion conformable to a touch screen of a device, the surface portion providing signals to the touch screen to emulate an input signal to the touch screen and includes a programmable controller that causes the surface portion to automatically provide specific signals at particular times to the touch screen to emulate user interaction with the device. The device may be a mobile device, such as a tablet with a touch enabled screen. The surface portion may provide signals that disrupt the capacitive electrical field of the touch screen. The programmable controller may be detachable from the surface portion. No signals may be provided from the programmable controller to the surface portion when the programmable controller is detached from the surface portion. The surface portion may provide screen protection for the touch screen. The touch emulator may receive touch input from a user.

16 Claims, 6 Drawing Sheets

(56) References Cited

U.S. PATENT DOCUMENTS

| | | | | |
|---|---|---|---|---|
| 2014/0168100 A1* | 6/2014 | Argiro | .................. | G06F 3/0416 345/173 |
| 2014/0240253 A1* | 8/2014 | Choi | ...................... | G06F 3/044 345/173 |
| 2014/0313142 A1* | 10/2014 | Yairi | ...................... | G06F 3/016 345/173 |
| 2015/0029095 A1* | 1/2015 | Gomez | .................. | G06F 3/017 345/156 |
| 2015/0103018 A1* | 4/2015 | Kamin-Lyndgaard | . | G09G 5/006 345/173 |
| 2015/0153768 A1* | 6/2015 | Shih | ...................... | G06F 1/1626 345/173 |
| 2015/0193072 A1* | 7/2015 | Lai | ........................ | G01B 7/003 345/174 |
| 2015/0205393 A1* | 7/2015 | Smus | ..................... | G06F 3/041 345/173 |
| 2015/0338982 A1* | 11/2015 | Dufva | .................... | G06F 3/023 345/168 |

* cited by examiner

PROGRAMMABLE TOUCH EMULATING DEVICE

CROSS-REFERENCE TO RELATED APPLICATIONS

This application claims priority to U.S. Prov. App. No. 61/930,156, filed Jan. 22, 2014, and entitled "PROGRAMMABLE TOUCH EMULATING DEVICE," which is incorporated by reference herein.

TECHNICAL FIELD

This application relates to the fields of data entry, data presentation and user interface, and more particularly to the field of programmable emulation device to facilitate and teach user interactions with a touchscreen tablet or mobile phone.

BACKGROUND OF THE INVENTION

According to market statistics, the number of connected mobile devices, including mobile phones and tablets, has already exceeded the population of our planet. Smartphones and tablets have outsold personal computers for the first time in the fourth quarter of 2011, while by the fourth quarter of 2014, the unit shipment volume of tablets alone is exceeding cumulative personal and business PC shipments. Market researchers are forecasting that by 2016, there will be over ten billion Internet-connected mobile devices in the hands of end users, including approximately eight billion smartphones and tablets, while by 2017, about 87% of market share of smart connected devices is expected to belong to smartphones and tablets compared with just 13% for desktop and mobile PCs.

Smartphones and tablets have become full-feature computers with high resolution screens, capable of running web browsers and native applications created for various mobile platforms such as iOS, Android, Windows, BlackBerry, etc. As of June, 2014, the Apple Inc.'s App Store offered for download over 1.2 million applications for iOS, of which almost 50% were optimized for iPad tablets; by mid-2014, users have downloaded over 75 billion copies of iOS applications and spent over $1 B in purchases from the App Store. At the end of 2014, the App Store included software applications in 24 main categories with hundreds of subcategories, covering every area of modern life from games, education and news to healthcare, productivity and weather. According to different estimates, a regular smartphone or tablet user on the iOS platform downloads and installs on average 40-100 iPhone or iPad applications within just a couple years of usage of these devices.

Smartphones and tablets have become mainstream computing devices that may be used to store important private and business information in various client side and cloud based applications, such as online and offline notebooks created in the Evernote software and service, developed by Evernote Corporation of Redwood City, Calif. Accordingly, data security on mobile devices represents a growing user requirement. Applications are being developed that employ both traditional techniques, such as using a pin number to unlock a device, and advanced techniques, such as using a fingerprint or an iris scanner and other biometric authentication technologies.

A notable change in operating computing devices in the last decade has been caused by the development and proliferation of touch based user interfaces, which are currently present on vast majority of smartphones and tablets on many available platforms. A basic set of multi-touch gestures, such as one and two finger panning or scrolling, swiping for fast scrolling with inertia, single and double tapping to open applications and navigate object hierarchies, tapping and holding to initiate selection, two-finger resizing of screen objects (pinching and reverse pinching), in addition to typing on soft keyboards and modifications of the screen objects, represent a fundamental shift in the ways people acquire, process, share and digital information.

One type of touch screen technology powering a new generation of smartphones and tablets is projective capacitive technology. Multi-touch projective capacitive touch screens are designed to detect relatively large objects touching the screen, such as one or several fingertips, a large specially designed pen tip, etc. Projective capacitive technology is a grid sensor technology whereby a conductive grid under the screen glass creates an electrostatic field and senses objects in the vicinity of the screen surface by interference of the objects with the electromagnetic flux in different nodes of the grid. Other touch screen technologies, such as resistive, electromagnetic inductive, infrared, ultrasound, optical, etc. may be used and may sometimes be combined to offer enhanced touch features to end users.

Notwithstanding fast expansion of smartphone and tablet usage and growing user familiarity with new features and the touch device operation metaphor, a portion of the user base may appear disadvantaged because of users' age, physical conditions, education level or other reasons. Some users experience difficulties typing on a touch screen, which may not provide an adequate tactile feedback; other users may have issues memorizing pins and passwords and may not be able to utilize built-in protection systems. Basic touch driven operating systems may also challenge some users. Additionally, a portion of users may experience difficulties downloading and installing software applications from applications stores and making their first unassisted steps in using such applications.

Accordingly, it is important to design methods, systems and devices for assisting users in hands free authentication on smartphones and tablet devices, installations of software applications from application stores, and instructing the users on first time application usage.

SUMMARY OF THE INVENTION

According to the system described herein, a touch emulator includes a transparent surface portion conformable to a touch screen of a device, the surface portion providing signals to the touch screen to emulate an input signal to the touch screen and includes a programmable controller that causes the surface portion to automatically provide specific signals at particular times to the touch screen to emulate user interaction with the device. The device may be a mobile device, such as a tablet with a touch enabled screen. The surface portion may provide signals that disrupt the capacitive electrical field of the touch screen. The programmable controller may be detachable from the surface portion. No signals may be provided from the programmable controller to the surface portion when the programmable controller is detached from the surface portion. The surface portion may provide screen protection for the touch screen. The touch emulator may receive touch input from a user. Touch input provided to the touch emulator may be used to program the programmable controller to provide a recorded sequence of touch gestures corresponding to the touch input. The recorded sequence of gestures may be used to control the device at a later time when the user is not touching the surface portion of the touch emulator and is not touching the touch screen of the device. The user may observe functioning of the device while touching the touch emulator and may modify a programmed sequence of gestures in response thereto. The user may observe functioning of the device while the touch emulator is operating and may modify a programmed sequence of gestures in response thereto.

According further to the system described herein, operating a touch emulator includes programming the touch emulator to provide a sequence of signals corresponding to a sequence of touch gestures, coupling the touch emulator to a touch screen of a device, and causing the touch emulator to generate the sequence of signals to operate the device without a user touching the touch screen for at least some of the touch gestures. Programming the touch emulator may include causing the touch emulator to provide a set of signals that enters a PIN value on the touch screen of the device. Programming the touch emulator may include causing the touch emulator to provide a set of signals on the touch screen of the device that installs new software on the device. The user may not touch the touch screen while the touch emulator is providing the sequence of signals. The user may touch the touch screen while the touch emulator is providing the sequence of signals. Operating a touch emulator may also includes the touch emulator generating signals that provide an instructional sequence of operations on the device to a user and having the user repeat the instructional sequence on the device. In response to the user incorrectly repeating the instructional sequence, the touch emulator may generate additional signals that emulate the user touching correct portions of the touch screen.

According further to the system described herein, a non-transitory computer-readable medium contains software that operates a touch emulator. The software includes executable code that causes the touch emulator to provide a sequence of signals corresponding to a sequence of touch gestures when the touch emulator is coupled to a touch screen of a device and executable code that generates the sequence of signals to operate the device without a user touching the touch screen for at least some of the touch gestures. Executable code that generates the sequence of signals may cause the touch emulator to provide a set of signals that enters a PIN value on the touch screen of the device. Executable code that generates the sequence of signals may cause the touch emulator to provide a set of signals on the touch screen of the device that installs new software on the device. The user may not touch the touch screen while the touch emulator is providing the sequence of signals. The user may touch the touch screen while the touch emulator is providing the sequence of signals. The software may also include executable code that generates signals that provide an instructional sequence of operations on the device to a user, where the user repeats the instructional sequence on the device. The software may also include executable code generates additional signals that emulate the user touching correct portions of the touch screen in response to the user incorrectly repeating the instructional sequence.

The proposed system is based on a device combining a control module and a thin transparent surface overlaying a projective capacitive touch screen of a tablet, smartphone, touch panel or other touch sensitive element based on a projective capacitive technology (hereinafter, a "tablet"). The device may emit a sequence of electromagnetic signals in different parts of an active grid of the device according to customizable programs, thus interacting with the electromagnetic field of the tablet screen and emulating multi-touch gestures in various screen locations to cause the tablet to automatically perform various operations, pre-programmed in the control module as device routines, such as authentication, application installation, etc.

The device, thereinafter referred to as a "touch emulator", may be similar to an AMOLED (active-matrix organic light-emitting diode) screen used in tablets, differing from such matrix screens by a type of emitted signal. When a touch emulator is put in direct contact with a projective capacitive screen, an interaction between the touch emulator and the screen may be based on a technology analogous to technology provided by the Adonit Pixelpoint, which enables a precision stylus for writing on projective capacitive tablet screens. A touch emulator may include a removable control module located on an edge of the touch emulator. The control module may include a processing chipset with a memory, a small battery and a signal generator along an edge of the device. The control module may be connected to the touch emulator in an operational mode and may be separated from the touch emulator in a passive mode, thus converting the touch emulator into a screen protector. Alternatively, the touch emulator may be placed on a tablet screen only temporarily, as needed to execute routines on the tablet, in which case the control module may be made a permanent, non-removable part of the touch emulator. The control module of a touch emulator may also include a Bluetooth or other wireless connectivity technology allowing remote re-programming or activating pre-programmed routines.

The touch emulator may operate analogously to a desktop macro utility that imitates mouse moves and clicks; the touch emulator may follow a pre-recorded macro routine, that is, a sequence of actions on a target computer. Each action provided in connection with a touch emulator may be a multi-touch gesture emulated by electromagnetic signals of the touch emulator and applied in a designated location within a touch sensitive screen. Emulated gestures may occur in one screen location at a time (one-finger gestures) or simultaneously in multiple locations, emulating multi-touch gestures performed by multiple fingers, such as a two-finger pinching or object rotation. Emulated gestures may also emulate a continuous gesture, such as scrolling or swiping with one or more fingers by generating a sequence of signals along a scrolling path in a needed direction and with a speed characteristic for the particular gesture performed manually (e.g., slower for a scrolling gesture, faster for a swiping gesture)

Examples of programming and execution of recorded routines by a touch emulator are provided below.

A new touch emulator may be paired with a unit of a tablet or a smartphone via an authentication handshake routine. The routine may be programmed on both the touch emulator and the tablet to provide authentication similar to a pin code authentication. For example, a tablet screen may be divided into nine cells of a uniform 3×3 grid. Then, each cell may correspond to a digit from one to nine where the top left cell, independently from the screen orientation (portrait or landscape), may encode the digit one, the bottom right cell may correspond to the digit nine and the rest may be denoted in the row-first order, so that the first row from the top left to the top right cell may correspond to digits one, two, and three. The touch emulator may be programmed to emulate a touch sequence where subsequent emulated clicks are performed close to centers of several cells of the grid (for instance, a four-digit sequence 9651), which may serve as a generalized pin number for an automatic user authentication. Every time a touch emulator is placed on a screen of the locked tablet, the sequence may be produced automatically or upon receiving a user instruction, which generates the sequence and unlocks the tablet as if the same four-digit pin number 9651 was entered on the tablet's soft keyboard.

User authentication via a touch emulator may also be based on a variable authentication token, a response code similar to a cryptographic nonce or an RSA code, which is unknown to the tablet software and may be pseudo-randomly generated by a processing unit of the touch emulator (which plays in this scenario the role of a hardware token). An algorithmic generator may be verifiable by the tablet and may depend on an encrypted source parameter, which may be pre-programmed during an initial pairing session between the touch emulator and the tablet, uniquely binding the touch emulator and the tablet. Variable authentication token authentication may be used as a sole authentication mechanism or in a two-factor authentication scheme in addition to a known password-like pin code, explained elsewhere herein.

Another example of usage of a touch emulator may include an instructional routine for teaching a new user how to install a new application from an application store (such as the Apple App Store for iOS devices or the Google Play for Android smartphones and tablets) on a tablet or a smartphone. The touch emulator may reproduce a sequence of steps required to install a new application from the store depending on specific layouts of the store pages, for example:
- Tapping an application store icon on a tablet of a user (the location of the icon may be captured during programming of the touch emulator).
- Activating an application search field by clicking a search button or tapping within a search field if the search field is permanently present on the application store page.
- Emulating a sequence of characters typed on a soft keyboard (which automatically pops up on the screen after the edit cursor has been placed into the search field) and representing a full name of the installed application and then activating search in the applications store.
- Tapping an Install button or performing other touch-based installation instruction depending on specifics of the application store.
- After the installation on the user device has been completed, locating an icon of the newly installed application and tapping the icon to demonstrate to the user a launch process for the application.

Designing and recording a program on a touch emulator may be done in several steps. First, a sequence of multi-touch gestures (including data entry on a software keyboard) with necessary time intervals within and between gestures and with appropriate touch coordinates may be captured on a tablet screen by a special utility running on the tablet. Then, the sequence may be edited in a macro editor, tested on the tablet and added as a routine to the built-in memory of the touch emulator. Alternatively, the touch emulator may possess not only a gesture imitation capacity but also possess a touch sensitive interface, with the capability to record time-coordinate sequences of touch gestures when the touch emulator is applied to a tablet screen, while simultaneously translating the gestures to the tablet screen where a user-instructor may watch the impact of gestures upon the tablet functioning and add fragments of the recorded sequence to the routine or withhold other fragments (for example, erroneous gestures or unneeded repetitions of gestures) from the routine.

An example of a touch emulator project may be pre-programming an installation process for a desired set of tablet applications by an expert user, as explained elsewhere herein; the recording may be created on a touch emulator paired with a tablet belonging to a novice user who does not have enough experience to install needed software applications independently. An automatic execution of such routine by applying a touch emulator of the new user to the tablet screen (possibly following an authentication and unlocking step, explained above) may install one or a set of mutually agreed upon software applications on a tablet of the new user without any manual intervention. Such a routine may be used both to direct expansion of tablet capabilities of the new user and to provide instructional help, introducing the new user to the world of installable software on the new device. It should be noted that, in the latter case of instructional help, the pre-programmed routine on the touch emulator may possess an additional step of uninstalling the new application so that the routine may be repeated from a clean state where the previously-installed application is absent on the device.

A touch emulator which combines a core gesture emulation capability with a touch interface for pre-programming, as explained elsewhere herein, may also be used as an emulator with a user feedback in a routine execution process. For example, recorded routines may provide breakpoints where routine execution waits for a user to enter a certain gesture or a sequence of gestures, such as encouraging the user to complete a routine without a help from the emulator. The routine may evaluate user feedback and compare touch gestures entered by the user with the gestures that would have been produced by the touch emulator. As long as the user maintains a correct sequence, the touch emulator may follow as the user replaces the automatic routine with a manual sequence of the user. However, erroneous user gestures may cause the touch emulator to suspend user activity, after several user attempts, and continue in an automatic mode until a next breakpoint or until the end of the routine.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for emulating sequences of multi-touch gestures on a touch screen of a smartphone, a tablet or other mobile device via a programmable touch emulator, emitting electromagnetic signals interacting with the touch screen of the mobile device. Pre-programming a touch emulator with custom routines allows emulating complex activities on a mobile device with a touch screen and makes the touch emulator a tool for device authentication, user training and other purposes.

Figure 1A:
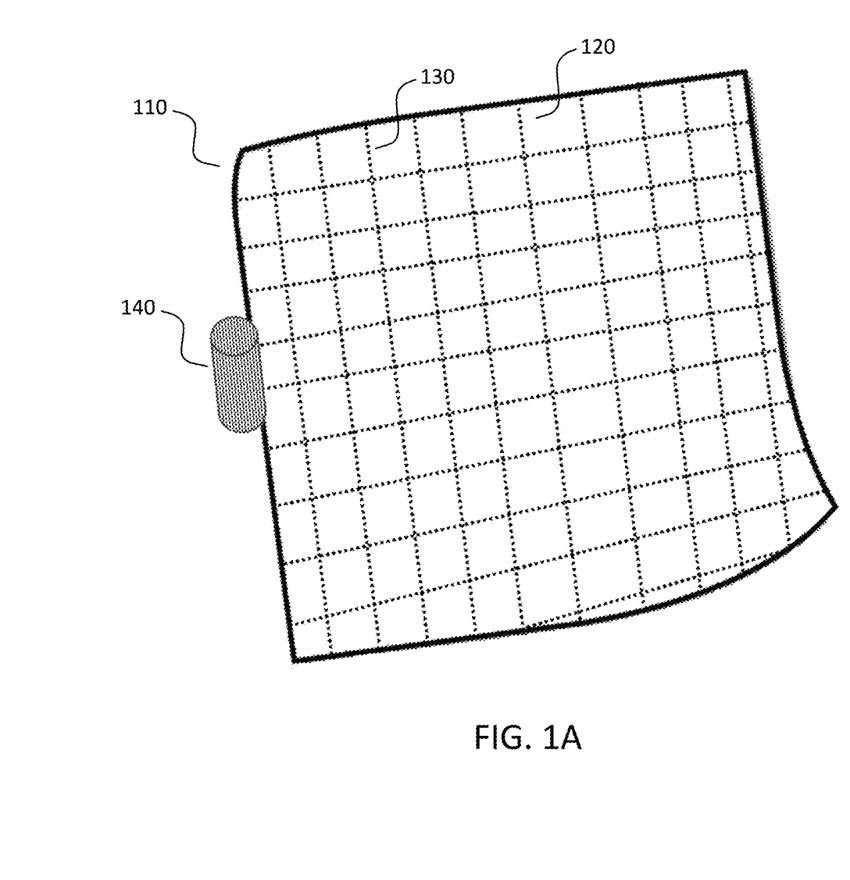
FIGS. 1A-1B are schematic illustrations of an assembled touch emulator and of a control module thereof, according to an embodiment of the system described herein.
Figure 1B:
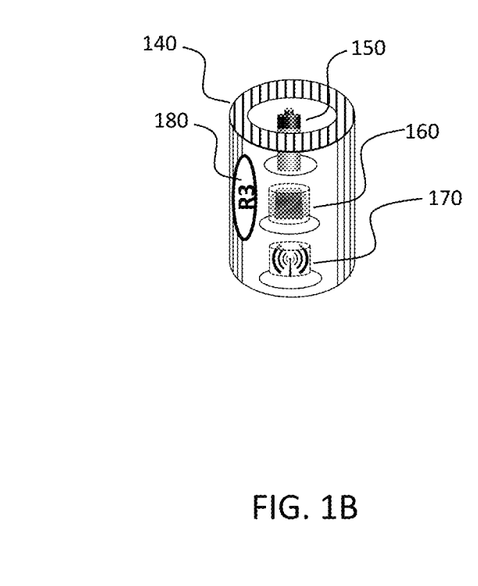

FIGS. 1A-1B are schematic illustrations of an assembled touch emulator 110 and of a control module 140 thereof. The touch emulator 110 consists of two parts: a thin transparent surface 120 with an invisible grid 130 (intentionally made visible in FIG. 1A) emulating electromagnetic signals; and the control module 140. The thin transparent surface 120 provides one or more signal that are sensed by a touch screen of a touch screen device as one or more touches by a user even if no user touches either the touch emulator or the touch screen of the device. In an embodiment herein, the touch screen device uses active-matrix organic light-emitting diode technology and the transparent surface uses technology that disrupts the capacitive electrical field of the touch screen in a manner similar to disruption in the capacitive field provided by a touch screen input device such as a finger of a user or a stylus.

Components of the control module 140 are shown in FIG. 1B and include a battery 150, a chipset (processor and memory) 160, a signal generator 170 and a control panel 180 allowing a user to switch routines performed by the touch emulator 110. The control module may also include wireless connectivity components (not shown in FIG. 1B), as well as bus connections between components, connection to the surface 120 and other parts. As explained elsewhere herein, the control module 140 may be permanently connected to the surface component 120, which may indicate a periodic use of the touch emulator with a corresponding tablet. Alternatively, the control module 140 may be detachable, in which case the touch emulator 110 may have an active mode when the control module 140 is attached and the touch emulator 110 is used for imitating mobile device activities, such as application workflows, and may have a passive mode when the transparent surface 120 may serve as a permanent screen protector for the mobile device of the user.

Figure 2:
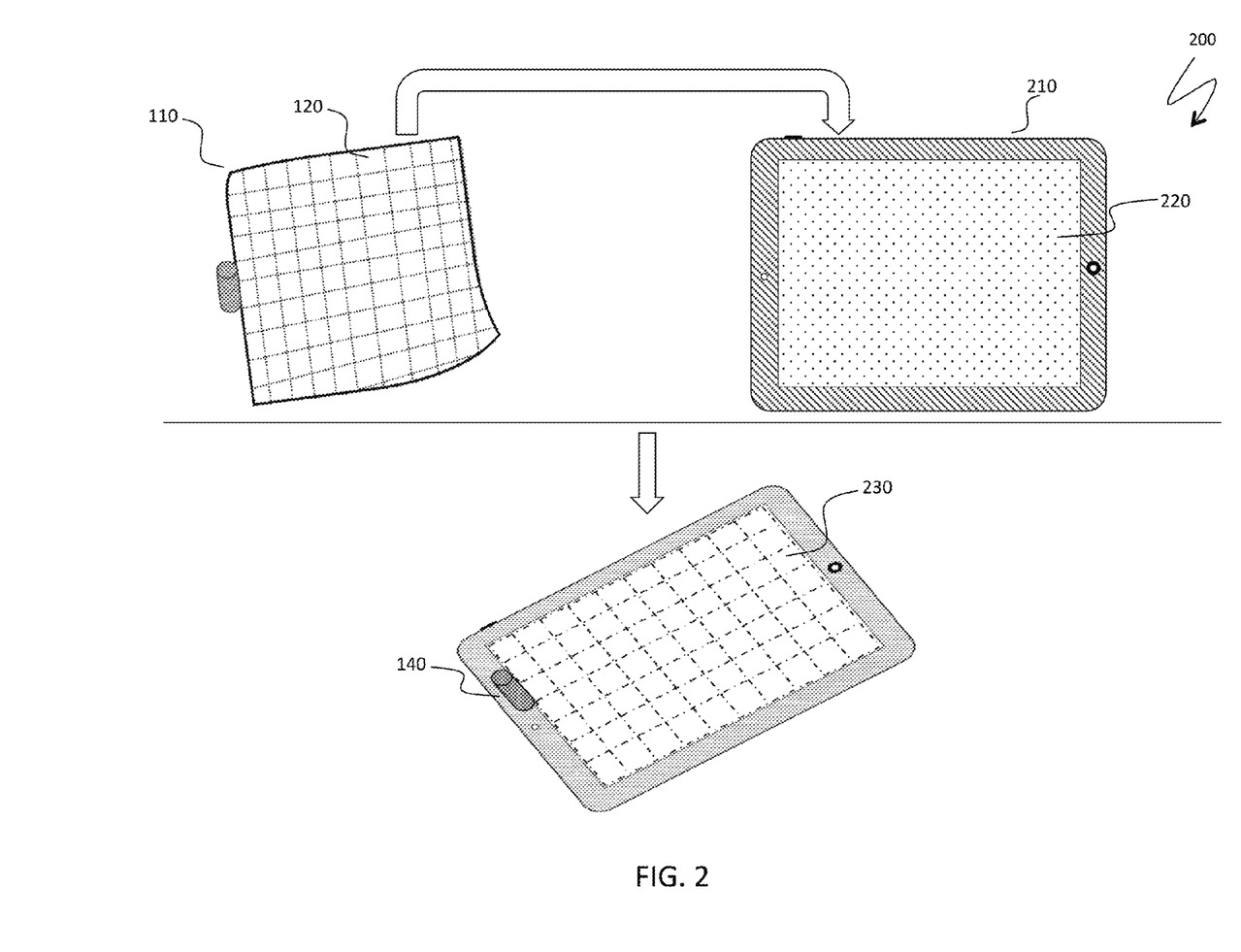
FIG. 2 schematically illustrates applying a touch emulator to a tablet touch screen, according to an embodiment of the system described herein.

FIG. 2 is a schematic illustration 200 of applying the touch emulator 110 to a touch screen of a tablet 210. A user places the surface 120 of the touch emulator 110 on a screen 220 of the tablet 210 (shown here in a landscape orientation) so that the surface 120 sticks to the screen 220 (using, for example, magnets, Velcro attachments, etc.) producing an overlay 230. In some cases, natural surface-to-surface stickiness is sufficient without any supplementary mechanism. The surface 120 conforms to the touch screen of the tablet or to at least a portion thereof. Note that the control module 140 does not interfere with normal operation of the tablet 210.

Figure 3:
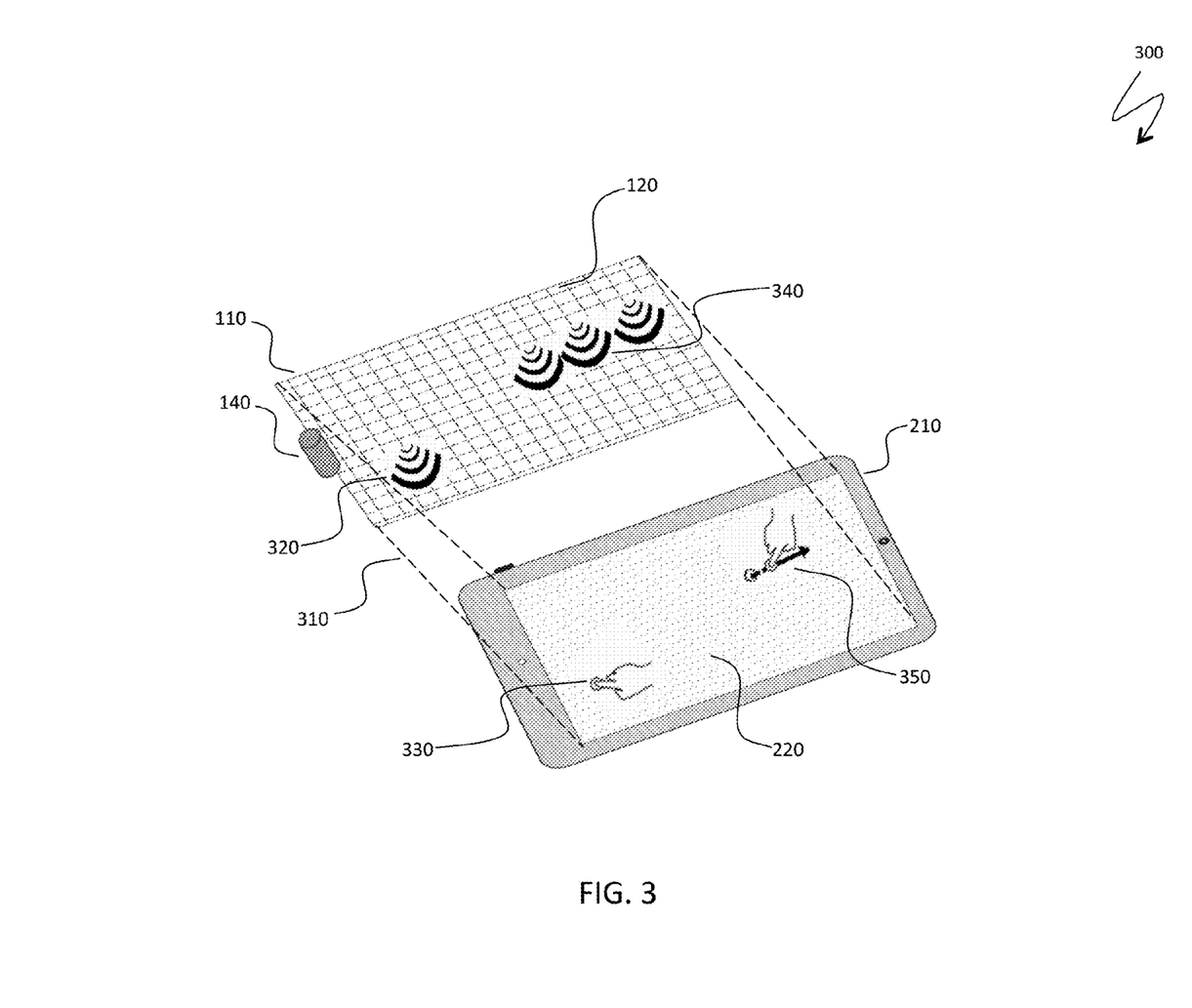
FIG. 3 is a schematic illustration of a touch emulation process, according to an embodiment of the system described herein.

FIG. 3 is a schematic illustration 300 of a touch emulation process. The touch emulator 110 with the surface 120 and the control module 140 is shown apart from the tablet 210 and the screen 220 purely for illustrative purpose. In fact, the surface 120 overlays the screen 220, as further illustrated by dashed lines 310. Following a routine pre-loaded in memory of the control module 140, a signal generator of the control module 140 initiates electromagnetic signals at scheduled times and in predefined locations of the surface 120, which interact with the touch sensitive grid of the screen 220 to emulate multi-touch gestures. Thus, a single impulse 320 in a left bottom portion of the surface 120 emulates a single tap gesture 330 in a corresponding location of the screen 220, while a sequence 340 of signals with short intervals between the signals, directed from left to right in a right middle section of the screen 220 emulates a left-to-right swiping gesture 350.

Figure 4:
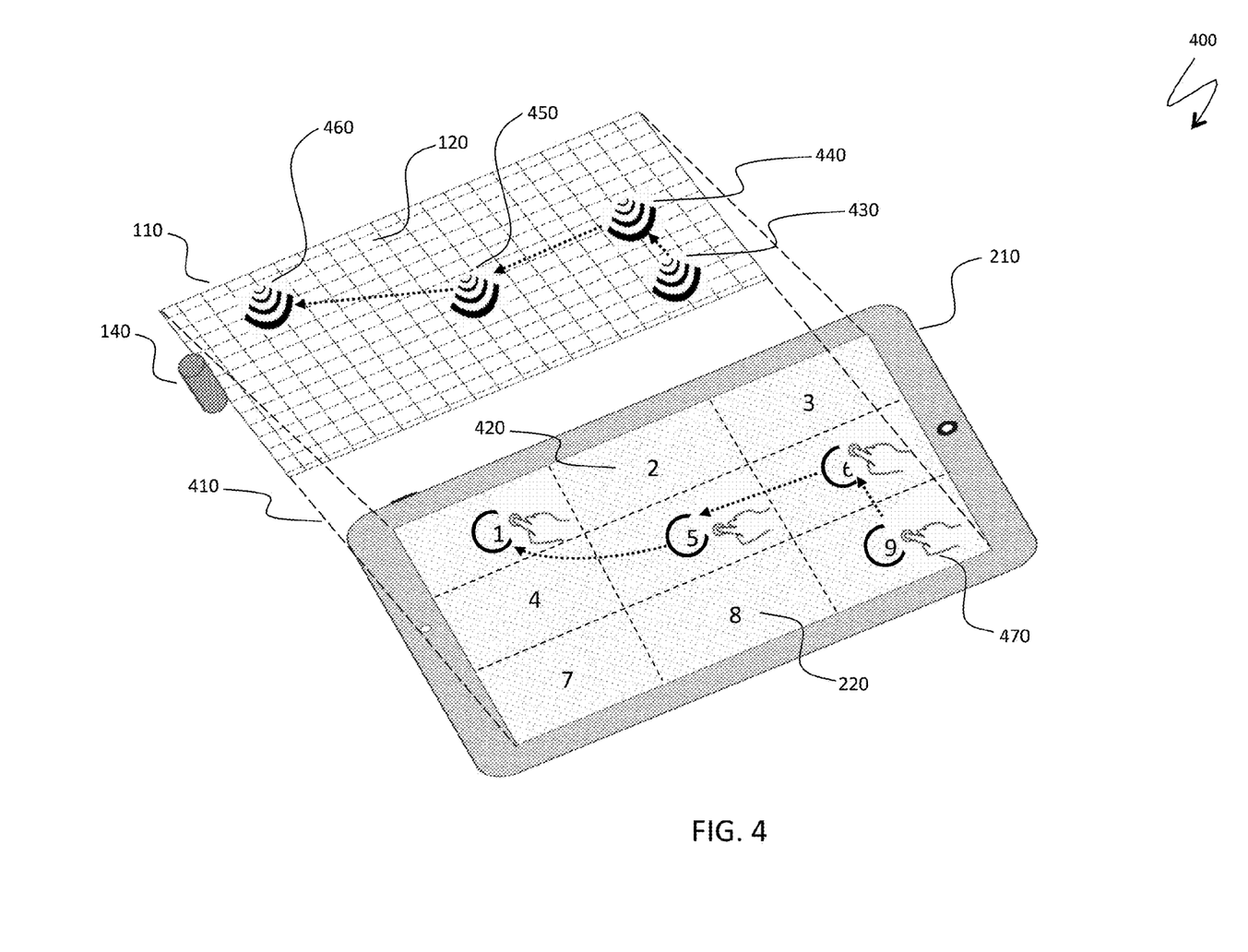
FIG. 4 is a schematic illustration of entering a pin code to unlock a tablet using a touch emulator, according to an embodiment of the system described herein.

FIG. 4 is a schematic illustration 400 of entering a pin code to unlock the tablet 210 using the touch emulator 110. Similarly to FIG. 3, the touch emulator 110 with the transparent surface 120 and the control module 140 is shown unattached to the screen 220 of the tablet 210 when in fact the touch emulator 110 is superimposed over the screen 220, as indicated by dashed projection lines 410. The tablet 210 is locked and the screen 220 is subdivided into nine zones 420 (a three-by-three matrix with nine congruent cells) so that a tap in each zone enters, after signal detection and processing, a corresponding number ranging from one to nine.

An unlocking routine recorded in memory of the control module 140 generates a succession of four signals 430, 440, 450, 460, which interact with a touch sensing grid of the screen 220 and emulate a sequence of taps 470 in four zones of the screen 220, thus entering a four-digit pin number 9651, which unlocks the tablet 210, as explained elsewhere herein.

Figure 5:
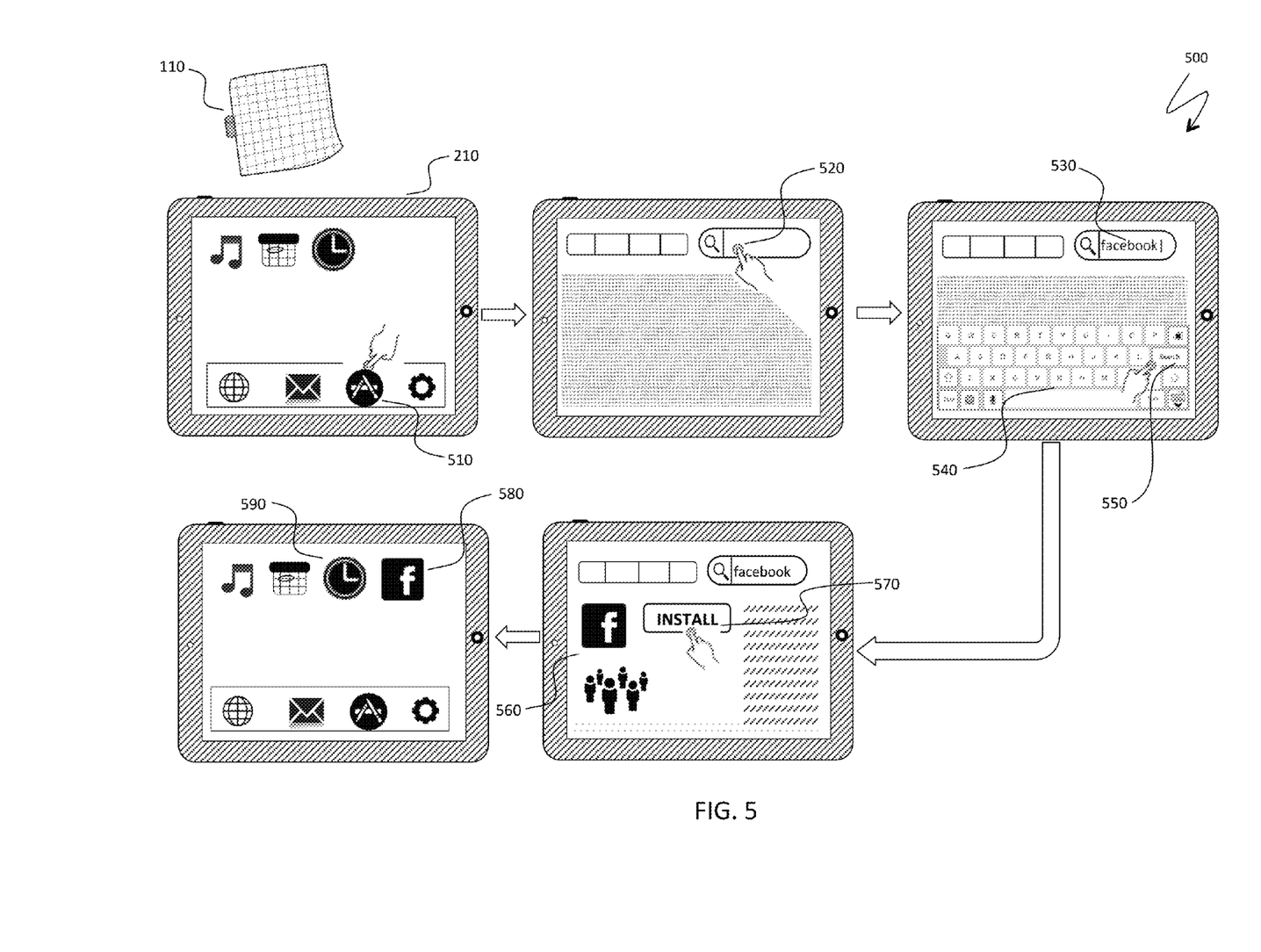
FIG. 5 is a schematic illustration of a custom routine emulating installation of a software application, according to an embodiment of the system described herein.

FIG. 5 is a schematic illustration 500 of a custom routine emulating installation of a software application. The touch emulator 110 shown separately from tablet screens is in fact attached to the screen of the tablet 210 throughout the whole multi-step process illustrated in FIG. 5.

At a first step, the emulator 110 imitates a tap on an application store icon 520, which opens an application store. At a second step, a touch emulation routine follows a known layout of an opened page of the application store (displayed in FIG. 5 in an abbreviated form with a shaded area of the screen) and positions the cursor in a search window of the store page by emulating a tap 520 within the search window. Note that activating an edit cursor in the search window calls to the screen a soft keyboard 540 for text input.

At a third step, the touch emulator 110 produces a desired text input 530 in the search window by generating a sequence of signals at locations of corresponding keys on the soft keyboard 540. After the text is entered, the touch emulator 110 activates a Search key 550 on the keyboard 540 to perform the search in the application store. At a fourth step, the application store retrieves and displays an information and installation page 560 of the desired application (in this case, a mobile version of the Facebook software) and the touch emulator 110 initiates installation by imitating a tap 570 on an Install button located at a standard place on application pages. It should be noted that the application store checks whether an application is already installed on a device and displays the Install button only when the application is absent. Therefore, for repetitive uses of the touch emulation routine explained in FIG. 5, an additional step (not shown in FIG. 5) of the touch emulation routine, uninstalling the application from the user device, may be used. At a fifth step, an application 580 is installed on the tablet 210 and is appended to a list 590 of previously installed software applications.

Figure 6:
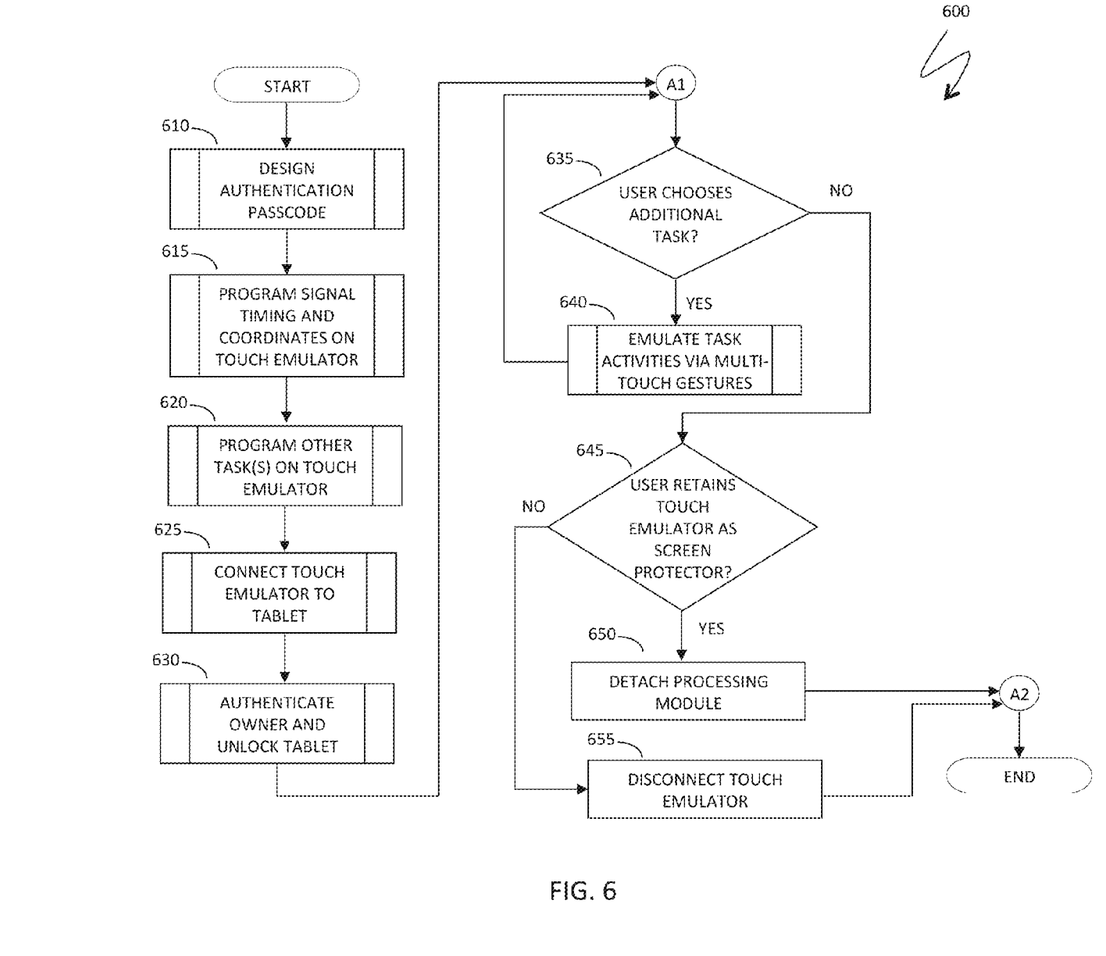
FIG. 6 is a system flow diagram illustrating system functioning, according to an embodiment of the system described herein.

Referring to FIG. 6, a flow diagram 600 illustrates processing performed in connection with functioning of the system described herein. Processing starts at a step 610, where an authentication passcode is facilitated, as explained elsewhere herein, including FIG. 4 and the associated text. After the step 610, processing proceeds to a step 615, where the user programs signal timing and required coordinates on the touch emulator to build an unlocking routine. After the step 615, processing proceeds to a step 620, where the user programs other tasks (routines) on the touch emulator. After the step 620, processing proceeds to a step 625, where the touch emulator is connected (overlaid) to the tablet. Note that in some embodiments, the step 625 may be omitted where programming of touch routines may occur via user interactions with the touch emulator attached to the tablet (e.g. a touch emulator with touch sensitive surface, as explained elsewhere herein).

After the step 625, processing proceeds to a step 630, where the connected touch emulator authenticates the user (device owner) and unlocks the tablet by entering a pin code as explained in conjunction with FIG. 4; alternative or additional methods of pairing the touch emulator with the user tablet and of establishing a unique binding between the touch emulator and the tablet are explained elsewhere herein. Note that if the tablet is already unlocked at the time of connecting the touch emulator, the step 630 may be omitted.

After the step 630, processing proceeds to a test step 635, where it is determined whether the tablet (mobile device) owner chooses an additional task to be performed by the touch emulator. If so, processing proceeds to a step 640 where the touch emulator imitates multi-touch gestures according to a chosen routine (see FIG. 5 and the accompanying text on switching routines performed by the touch emulator). After the step 640, processing proceeds back to the step 635 to initiate a new or repetitive routine or to complete a user session. If it is determined at the step 635 that the user has no more tasks for the touch emulator to perform, processing proceeds to a test step 645, where it is determined whether the user wishes to retain the touch emulator as a screen protector (note that this step is available only for touch emulators with detachable control modules, as explained elsewhere herein). If so, processing proceeds to a step 650 where the user detaches the control module and retains the emitting surface of the touch emulator in a passive mode as a screen protector; otherwise, processing proceeds to a step 655 where the user completely disconnects the touch emulator from the mobile device. After each of the steps 650, 655, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The system described herein may work with any touch screen used with a device. The device may include any mobile device and may be a conventional tablet, a smartphone, and/or a PC with a detachable screen that acts as a tablet, although other devices are also possible. The system described herein may be implemented with any type of electronic screen capable of being actuated by a single or multiple finger touches, based on projective capacitive, resistive, inductive electromagnetic or other technology.

Note that mobile device(s) capable of running the system described herein may include software that is pre-loaded with the device, installed from an application store, installed from media such as a CD, DVD, etc., and/or downloaded from a Web site. The mobile device may use an operating system such as iOS, Android OS, Windows Phone OS, Blackberry OS and mobile versions of Linux OS.

Software implementations of the system described herein may include executable code that is stored in a computer readable medium on a touch emulator and/or a mobile device and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A touch emulator, comprising:
a transparent surface portion conformable to a touch screen of a device, the surface portion providing signals to the touch screen to emulate an input signal to the touch screen; and
a programmable controller that causes the surface portion to automatically provide specific signals at particular times to the touch screen to emulate user interaction with the device,
wherein the programmable controller modifies a program sequence of gestures provided by the touch emulator based on touch input received from a user touching the touch emulator in response to a device operation presented to the user while the touch emulator is performing the program sequence of gestures, and
wherein the programmed sequence of gestures is used to control the device at a later time when the user is not touching the surface portion of the touch emulator and is not touching the touch screen of the device.

2. The touch emulator, according to claim 1, wherein the device is a mobile device.

3. The touch emulator, according to claim 2, wherein the mobile device is a tablet with a touch enabled screen.

4. The touch emulator, according to claim 1, wherein the surface portion provides signals that disrupt the capacitive electrical field of the touch screen.

5. The touch emulator, according to claim 1, wherein the programmable controller is detachable from the surface portion.

6. The touch emulator, according to claim 5, wherein no signals are provided from the programmable controller to the surface portion when the programmable controller is detached from the surface portion.

7. The touch emulator, according to claim 1, wherein the surface portion provides screen protection for the touch screen.

8. A touch emulator, comprising:
a transparent surface portion conformable to a touch screen of a device, the surface portion providing signals to the touch screen to emulate an input signal to the touch screen; and a programmable controller that causes the surface portion to automatically provide specific signals at particular times to the touch screen to emulate user interaction with the device, wherein the touch emulator receives touch input from a user and the touch input provided to the touch emulator is used to program the programmable controller to provide a recorded sequence of touch gestures corresponding to the touch input, and wherein the programmable controller modifies a program sequence of gestures provided by the touch emulator based on touch input received from the user touching the touch emulator in response to a device operation presented to the user while the touch emulator is performing the program sequence of gestures.

9. A method of operating a touch emulator, comprising:
programming the touch emulator to provide a sequence of signals corresponding to a sequence of touch gestures;
coupling the touch emulator to a touch screen of a device; and
causing the touch emulator to generate the sequence of signals to operate the device without a user touching the touch screen for at least some of the sequence of touch gestures,
wherein programming the touch emulator includes causing the touch emulator to provide a set of signals on the touch screen of the device that installs new software on the device, and
wherein the touch emulator provides the set of signals without the user touching the touch screen.

10. The method, according to claim 9, wherein programming the touch emulator also includes causing the touch emulator to provide a set of signals that enters a personal identification number (PIN) value on the touch screen of the device.

11. A method of operating a touch emulator, comprising:
programming the touch emulator to provide a sequence of signals corresponding to a sequence of touch gestures;
coupling the touch emulator to a touch screen of a device;
causing the touch emulator to generate the sequence of signals to operate the device without a user touching the touch screen for at least some of the sequence of touch gestures, wherein the touch emulator provides the sequence of signals while the user touches the touch screen;
generating signals by the touch emulator, the generated signals providing an instructional sequence of operations on the device to a user; and
instructing the user to repeat the instructional sequence.

12. The method, according to claim 11, wherein in response to the user incorrectly repeating the instructional sequence, the touch emulator generates additional signals that emulate the user touching correct portions of the touch screen.

13. A non-transitory computer-readable medium containing software that operates a touch emulator, the software comprising:
executable code that causes the touch emulator to provide a sequence of signals corresponding to a sequence of touch gestures when the touch emulator is coupled to a touch screen of a device; and
executable code that generates the sequence of signals to operate the device without a user touching the touch screen for at least some of the sequence of touch gestures,
wherein the executable code that generates the sequence of signals causes the touch emulator to provide a set of signals on the touch screen of the device that installs new software on the device, and
wherein the touch emulator provides the set of signals without the user touching the touch screen.

14. The non-transitory computer-readable medium, according to claim 13, wherein the executable code that generates the sequence of signals also causes the touch emulator to provide a set of signals that enters a personal identification number (PIN) value on the touch screen of the device.

15. A non-transitory computer-readable medium containing software that operates a touch emulator, the software comprising:
executable code that causes the touch emulator to provide a sequence of signals corresponding to a sequence of touch gestures when the touch emulator is coupled to a touch screen of a device;
executable code that generates the sequence of signals to operate the device without a user touching the touch screen for at least some of the sequence of touch gestures, wherein the touch emulator provides the sequence of signals while the user touches the touch screen; and
executable code that generates signals that provide an instructional sequence of operations on the device to the user and instruct the user to repeat the instructional sequence.

16. The non-transitory computer-readable medium, according to claim 15, further comprising:
executable code that generates additional signals that emulate the user touching correct portions of the touch screen in response to the user incorrectly repeating the instructional sequence.

* * * * *